US010662503B2

(12) United States Patent
Vaughan et al.

(10) Patent No.: US 10,662,503 B2
(45) Date of Patent: *May 26, 2020

(54) METHOD OF ORE PROCESSING USING MIXTURE INCLUDING ACIDIC LEACH SOLUTION AND OXIDIZING AGENT

(71) Applicant: The University of Queensland, St. Lucia (AU)

(72) Inventors: James Vaughan, St. Lucia (AU); William Hawker, St. Lucia (AU)

(73) Assignee: THE UNIVERSITY OF QUEENSLAND, Queensland (AU)

(*) Notice: Subject to any disclaimer, the term of this patent is extended or adjusted under 35 U.S.C. 154(b) by 243 days.

This patent is subject to a terminal disclaimer.

(21) Appl. No.: 15/241,200

(22) Filed: Aug. 19, 2016

(65) Prior Publication Data

US 2016/0355906 A1  Dec. 8, 2016

Related U.S. Application Data

(63) Continuation-in-part of application No. 13/981,823, filed as application No. PCT/AU2012/000058 on Jan. 25, 2012, now Pat. No. 9,447,480.

(30) Foreign Application Priority Data

Jan. 25, 2011 (AU) .............................. 2011900232

(51) Int. Cl.
*C22B 3/00* (2006.01)
*C25C 1/08* (2006.01)
(Continued)

(52) U.S. Cl.
CPC .......... *C22B 23/0476* (2013.01); *C22B 3/045* (2013.01); *C22B 15/0067* (2013.01);
(Continued)

(58) Field of Classification Search
CPC ................................................. C22B 23/0476
See application file for complete search history.

(56) References Cited

U.S. PATENT DOCUMENTS 4,435,368 A  3/1984  Demarthe et al.
6,409,979 B1  6/2002  White
(Continued)

FOREIGN PATENT DOCUMENTS

AU  2008255245  7/2009
AU  2009200219  8/2009
(Continued)

OTHER PUBLICATIONS

James Nolan, "Preferential Precipitation of Cobalt by Oxidation," The University of Queensland Australia—Bachelor of Engineering Thesis, Oct. 30, 2008, 106 pages.
(Continued)

*Primary Examiner* — Melissa S Swain
(74) *Attorney, Agent, or Firm* — Nixon & Vanderhye PC (57) ABSTRACT

A method of selectively leaching a metal such as nickel from an ore or ore processing intermediate comprising the metal and cobalt. The ore or ore processing intermediate is contacted with an acidic leach solution comprising an amount of an oxidising agent sufficient to oxidise a major portion of the cobalt to thereby cause it to be stabilised in the solid phase while a major portion of the metal is dissolved for subsequent recovery.

24 Claims, 5 Drawing Sheets

(51) Int. Cl.
 *C22B 15/00* (2006.01)
 *C22B 3/04* (2006.01)
(52) U.S. Cl.
 CPC ............ *C22B 19/22* (2013.01); *C22B 23/043* (2013.01); *C22B 23/0415* (2013.01); *C22B 23/0461* (2013.01); *C25C 1/08* (2013.01); *Y02P 10/234* (2015.11); *Y02P 10/236* (2015.11)

(56) References Cited

U.S. PATENT DOCUMENTS

| | | |
|---|---|---|
| 6,428,604 B1 | 8/2002 | Kerfoot |
| 8,580,213 B2 | 11/2013 | Kobayashi et al. |
| 2014/0023572 A1 | 1/2014 | Vaughan et al. |

FOREIGN PATENT DOCUMENTS

| | | |
|---|---|---|
| CA | 1096636 | 3/1981 |
| CA | 1195511 | 10/1985 |
| JP | 52-096903 | 8/1977 |
| JP | 2005-104809 | 4/2005 |
| JP | 2010-180439 | 8/2010 |

OTHER PUBLICATIONS

International Search Report for PCT/AU2012/000058, dated Mar. 5, 2012.
Written Opinion of the International Searching Authority for PCT/AU2012/000058, dated Mar. 5, 2012.
International Preliminary Report on Patentability issued in International Application No. PCT/AU2012/000058 dated Jul. 30, 2013.

METHOD OF ORE PROCESSING USING MIXTURE INCLUDING ACIDIC LEACH SOLUTION AND OXIDIZING AGENT

This application is a continuation-in-part of application Ser. No. 13/981,823 filed Sep. 20, 2013, which is a National Phase of International Application No. PCT/AU2012/000058 filed Jan. 25, 2012, which claims priority to Australian Application No. 2011900232 filed Jan. 25, 2011, the entire contents each of which are hereby incorporated by reference in this application.

FIELD OF THE INVENTION

The present invention relates to a method of recovering a metal from a source material. Particularly, the present invention relates to a method of selectively recovering a metal directly from a solid ore or ore processing intermediate containing said metal and cobalt.

BACKGROUND OF THE INVENTION

Nickel is a valuable commodity and is predominantly sourced from either sulphide or laterite mineral deposits. Large high grade sulphide deposits are increasingly rare and so the processing of laterite ores is predicted to become the dominant source of the metal.

A common method of treating laterite ores is to leach the solids in acid. Acid leaching is generally followed by impurity precipitation, commonly achieved by adding limestone. Following impurity precipitation, nickel and cobalt are usually recovered from the aqueous solution together by either mixed sulphide precipitation, or mixed hydroxide precipitation. Mixed hydroxide precipitation is a relatively recent large scale industrial technology achieved by adding a basic chemical such as magnesia, lime, limestone or sodium hydroxide to the leach solution. The mixed hydroxide precipitate (MHP) consists of mostly nickel hydroxide but also contains valuable cobalt hydroxides and various other impurities. The MHP represents a more value concentrated product in that the approximately 1% nickel and 0.1% cobalt present in the original laterite ore are upgraded substantially in terms of their relative amounts in the MHP. Since the MHP has such a high valuable metal content, the feasibility of operating a centralized nickel and cobalt refinery increases. This is because the transportation costs for the upgraded intermediate product would be a fraction of that for the as-mined ore.

The MHP may be further processed in a number of ways. For example, it may be added to the melt of an iron smelter in order to alloy the contained nickel with iron. This process is not suitable for MHP with significant cobalt content as the valuable cobalt is not recovered.

Another major processing route for refining MHP is by leaching the material in an ammonia/ammonium carbonate solution. The nickel and cobalt dissolve in the ammonia solution to form ammonia complexes. Nickel is then extracted into an organic solvent to separate the nickel from the cobalt. The extracted nickel is then stripped from the organic phase and precipitated using steam. This forms a basic nickel carbonate which is then calcined to form nickel oxide which can be sold as a product in its own right or reduced using hydrogen gas to form nickel metal compacts. The cobalt is subsequently precipitated from the aqueous phase as a cobalt sulphide using hydrogen sulphide gas. This cobalt sulphide is then re-leached in acid, passed through multiple stages of solvent extraction and ion exchange to remove impurities, then switched to the aqueous ammonia system and concentrated before being precipitated as a pure cobalt oxy-hydroxide by steam stripping.

Such prior art approaches are generally either relatively energy intensive, do not return optimal nickel and/or cobalt recoveries, require an excessive number of processing stages or are sensitive to the presence of other impurities such as aluminium, iron and chromium.

There is a need for an improved method of recovering nickel from nickel containing ores. It would be desirable to provide for a straightforward separation of nickel from cobalt in MHP and enable an efficient recovery of both commodities.

Further, although the discussion above relates to the recovery of nickel and its separation from at least cobalt in a nickel and cobalt containing ore it will be appreciated that there is a need for the effective separation of a range of metals, in a similar manner, from the cobalt they are naturally associated with.

OBJECT OF THE INVENTION

The object of the invention is to overcome or at least alleviate one or more of the above problems or to at least provide for a useful commercial choice.

SUMMARY OF THE INVENTION

In one broad form the invention resides in a method of separating a non-cobalt metal from cobalt in a solid ore or ore processing intermediate comprising the non-cobalt metal and cobalt by contacting the solid ore or ore processing intermediate with an acidic solution comprising an oxidant to thereby selectively dissolve the non-cobalt metal and filtering off the solid cobalt to thereby separate the non-cobalt metal from the cobalt.

In a first aspect, although it need not be the only or indeed the broadest form, the invention resides in a method of selectively leaching a metal selected from the group consisting of nickel, copper and zinc from a solid ore or solid ore processing intermediate comprising the metal and cobalt, the method including:
 a) providing a mixture comprising an acidic leach solution and an oxidising agent; and
 b) mixing the mixture with the solid ore or solid ore processing intermediate,
wherein there is sufficient oxidising agent to stabilize greater than 95% by mass of the cobalt to cause it to be stabilised in a solid phase while greater than 50% by mass of the metal is selectively dissolved.

Preferably, the metal is nickel.

In preferred embodiment, there is sufficient oxidising agent to stabilize greater than 99% by mass of the cobalt to cause it to be stabilized in a solid phase.

Suitably, greater than 60% by mass of the metal is selectively dissolved.

In one embodiment, greater than 70% by mass of the metal is selectively dissolved.

In a further embodiment, greater than 80% by mass of the metal is selectively dissolved.

In another embodiment, greater than 90% by mass of the metal is selectively dissolved.

In an embodiment, greater than 95% by mass of the metal is selectively dissolved.

Suitably, the solid ore or solid ore processing intermediate comprising the metal and cobalt is a mixed nickel-cobalt hydroxide precipitate or a solid copper-cobalt or zinc-cobalt processing concentrate.

A 'major portion' may refer to greater than 50%, preferably greater than 60%, more preferably greater than 70%, even more preferably greater than 80% in relation, independently, to both stabilisation of the cobalt and/or manganese in the solid phase and to dissolution of the nickel.

A 'substantial portion' may refer to greater than 90%, preferably greater than 95% in relation, independently, to both stabilisation of the cobalt and/or manganese in the solid phase and to dissolution of the nickel.

Preferably, mixing the solid ore or solid ore processing intermediate with the mixture comprising the acidic leach solution and the oxidising agent results in a substantial portion of the cobalt being oxidised to thereby cause it to be stabilised in the solid phase while a major portion of the metal is dissolved.

Preferably, the oxidising agent has sufficient oxidising potential to oxidise cobalt(II) to cobalt(III).

Suitably, the oxidising agent is selected from the group consisting of persulphates, peroxides, permanganates, perchlorates, ozone, oxides and chlorine.

Preferably, the oxidising agent is a persulphate or a permanganate.

In one embodiment, the oxidising agent is sodium or potassium persulphate, sodium or potassium permanganate, ozone, magnesium or hydrogen peroxide, chlorine gas or sodium or potassium perchlorate. Sodium or potassium persulphate or sodium or potassium permanganate are particularly preferred.

In one preferred embodiment the oxidising agent is not a gaseous oxidising agent.

The solid ore or solid ore processing intermediate may further contain manganese and treatment with the acidic leach solution comprising an oxidising agent may stabilize at least a portion of the manganese in the solid phase.

In a further embodiment, the invention resides in a method of recovering nickel and cobalt from a mixed nickel-cobalt hydroxide precipitate including the steps of:
  (a) providing a mixture comprising an acidic leach solution and an oxidising agent, wherein there is sufficient oxidising agent to stabilise greater than 95% by mass of the cobalt to cause it to be stabilized in the solid phase while greater than 50% by mass of the nickel is selectively dissolved;
  (b) mixing the mixture with the mixed nickel-cobalt hydroxide precipitate
  (c) separating the cobalt in the solid phase from the acidic leach solution containing dissolved nickel to recover the cobalt in the solid phase; and
  (d) recovering the nickel from the acidic leach solution.

The nickel may be recovered as solid metal from the acidic leach solution by electrowinning or hydrogen reduction. Alternatively, the nickel may be recovered as a salt, for example, as solid nickel sulphate hydrate by crystallisation.

The mixed nickel-cobalt hydroxide precipitate may further comprise manganese and addition of an amount of oxidising agent also causes a major portion of the manganese to be stabilised in the solid phase while a major portion of the nickel is dissolved.

The method may further include the step of separating the solid manganese from the acidic leach solution.

The method may further include the step of separating the cobalt and manganese solids by selective dissolution of either cobalt or manganese in either acidic solution or alkaline ammonia containing solution.

Throughout this specification, unless the context requires otherwise, the words "comprise", "comprises" and "comprising" will be understood to imply the inclusion of a stated integer or group of integers but not the exclusion of any other integer or group of integers.

The various features and embodiments of the present invention referred to in the individual sections above apply, as appropriate, to other sections, mutatis mutandis. Consequently features specified in one section may be combined with features specified in other sections as appropriate.

Further features and advantages of the present invention will become apparent from the following detailed description.

BRIEF DESCRIPTION OF THE FIGURES

In order that the invention may be readily understood and put into practical effect, preferred embodiments will now be described by way of example with reference to the accompanying figures wherein.

DETAILED DESCRIPTION OF THE INVENTION

The present invention is predicated, at least in part, on the development of a method of preferentially directly leaching nickel, from a solid ore or ore processing intermediate comprising nickel and cobalt, into an acidic solution using a suitable oxidant to maintain the cobalt in the solid state. Although the discussion herein relates to the application of this method to a mixed nickel-cobalt hydroxide precipitate, it will be appreciated that it may be useful in the separation of nickel from cobalt within any suitable solid source material.

The present inventors have found that the selective dissolution of nickel from a mixed nickel-cobalt hydroxide precipitate is a surprisingly fast and effective method to separate out the nickel and cobalt when compared to certain prior art approaches which attempt to selectively precipitate cobalt from a cobalt and nickel solution. Selection of appropriate conditions including the choice of a strong oxidant, pH and relative amounts of acid and oxidant to source material can provide a surprisingly efficient separation.

Although the invention has been demonstrated herein with particular reference to the separation of nickel and cobalt it is believed that the present method is equally applicable to the separation of copper and/or zinc from cobalt. The separation of both copper and zinc from cobalt is based upon the same principles described herein in relation to nickel, with suitable adjustments.

The terms "oxidising agent" or "oxidant", as used herein, refer to a reagent which is capable of causing a substrate to increase its oxidation state, e.g. to lose an electron, the reagent itself being reduced (gaining an electron) in the process.

The term "mixed hydroxide precipitate" or "MHP", as used herein, refers to a solid mixed nickel-cobalt hydroxide precipitate being a known intermediate product in the commercial processing of nickel containing ores which comprises a variety of nickel, cobalt and, possibly manganese, compounds including oxides and hydroxides. It will be appreciated that references herein to "nickel", "cobalt" or "manganese" in relation to their separation may be taken as references to one or more of these compounds, including oxides and hydroxides of the metals. The nickel and cobalt are at a higher concentration within the MHP than in the original mined ores representing the source material.

The terms "stabilise", "stabilising" or "stabilised" are used herein in relation to preferentially maintaining cobalt and/or manganese as a solid, following treatment of the ore or ore processing intermediate with an acidic leach solution comprising an oxidant, while nickel or copper or zinc are dissolved. Thus the nickel or copper or zinc are dissolved in preference to the cobalt.

It has been found that a nickel and cobalt containing MHP can be directly treated with an acidic solution comprising a suitable oxidant, at an appropriate pH, to cause the cobalt to be stabilised in the solid phase while the nickel dissolves in the acidic solution. In other words, the nickel and cobalt containing MHP can be mixed with a mixture comprising an acidic leach solution and an oxidant. Alternatively, a mixture of acidic leach solution and an oxidant is prepared and the MHP is treated with this mixture. The cobalt containing solid can then be collected and the cobalt recovered by various suitable means. As a highly concentrated nickel solution can be obtained by this method, the nickel can be subsequently recovered from the solution by means including electrowinning to nickel metal, hydrogen reduction to nickel metal or crystallisation to nickel sulphate hydrate.

To demonstrate this improved method of separation and its advantages over the rather complex and inefficient methods of the prior art a number of experiments were carried out on Ravensthorpe MHP (Ravensthorpe Nickel Mine, Ravensthorpe, Western Australia) which was leached at 80° C. with a sulphuric acid solution. The nature of each test is set out in table 1, below.

TABLE 1

Leaching experiments carried out on MHP at 80° C.

| Test | Conditions | Comments |
|---|---|---|
| 1 | 175 g MHP in 1 L-solution. 7 additions of 7.5 mL 98% sulphuric acid over 3.5 hours. | Baseline - No Strong Oxidant |
| 2 | 175 g MHP in 1 L-solution. 8.65 g sodium persulphate as oxidant. 7 additions of 7.5 mL 98% sulphuric acid every 30 minutes over 3.5 hours | Low Dose of Strong Oxidant |
| 3 | 175 g MHP in 1 L-solution. 10 g sodium persulphate as oxidant initially with 4 further 5 g additions every 30 minutes. 15 additions of 4 mL 98% sulphuric acid every 10 minutes over 2.5 hours. | High Dose of Strong Oxidant |
| 4 | 43.75 g MHP in 250 mL-solution. 3.38 g sodium persulphate as oxidant. Solution held at pH 3 by addition of sulphuric acid for 1 hour. | Constant pH High Dose of Strong Oxidant |
| 5 | 43.75 g MHP in 250 mL-solution. 3.38 g sodium persulphate as oxidant. Solution held at pH 3 by addition of sulphuric acid for 2 hours. | Constant pH High Dose of Strong Oxidant |

The moisture and metal content of the MHP (dry basis) is shown in table 2.

TABLE 2

Ravensthorpe MHP Composition (dried)

| Property | |
|---|---|
| Moisture % | 48% |
| Nickel | 45% |
| Cobalt | 1.6% |
| Manganese | 2.7% |

Figure 1:
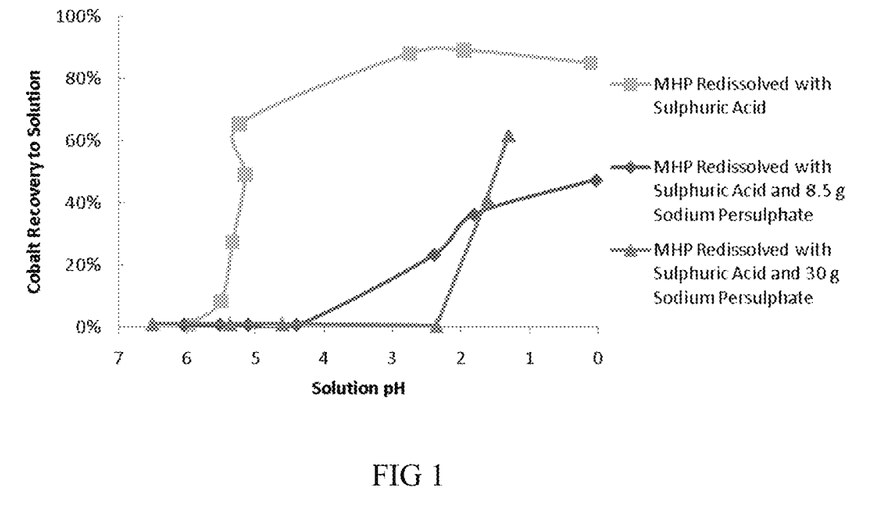
FIG. 1 is a graphical representation of the recovery of cobalt to solution from a mixed nickel-cobalt hydroxide precipitate over a range of pH values for three different test conditions.
Figure 2:
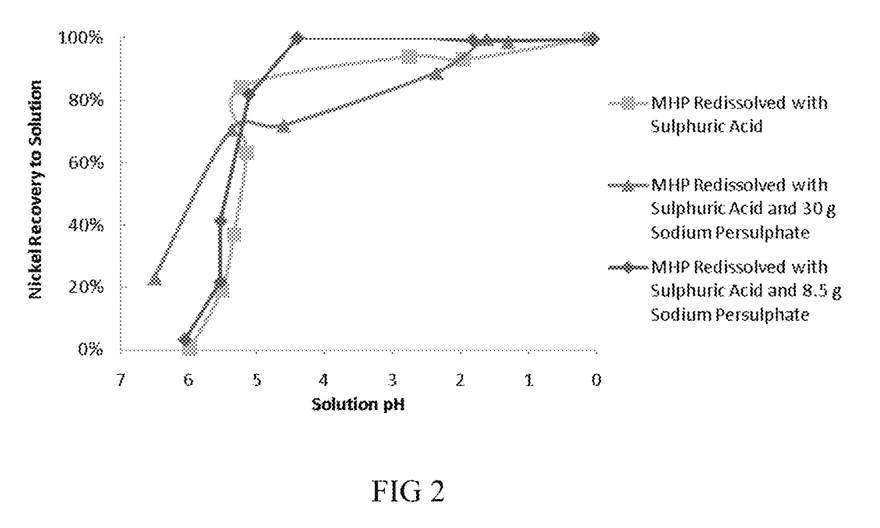
FIG. 2 is a graphical representation of the recovery of nickel to solution from a mixed nickel-cobalt hydroxide precipitate over a range of pH values for three different test conditions.
Figure 3:
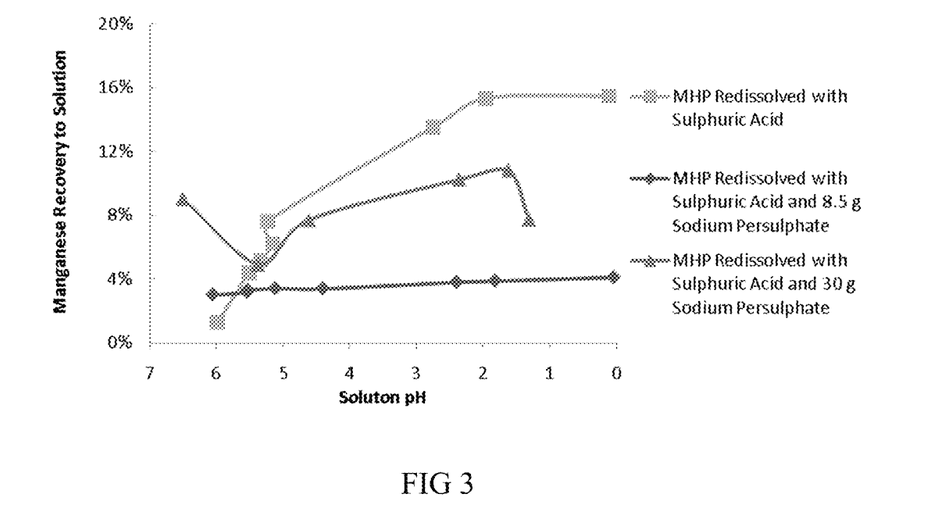
FIG. 3 is a graphical representation of the recovery of manganese to solution from a mixed nickel-cobalt hydroxide precipitate over a range of pH values for three different test conditions.

The effect of oxidant concentration on the dissolution of cobalt, nickel and manganese over a range of pH values, representing results from the above experiments, are shown in FIGS. 1, 2 and 3, respectively.

FIG. 1 is a graphical representation of the recovery of cobalt from the MHP into solution over a range of pH values achieved for tests 1 to 3. Test 1 showed that without any oxidant approximately 70% of the cobalt is in solution below pH 5 and more than 85% is in solution below pH 3. Tests 2 and 3 showed that the addition of sodium persulphate, as a strong oxidant, is extremely effective in stabilising the cobalt in the solid phase. Test 3 resulted in more than 99% of the cobalt being stabilised in the solid phase down to at least pH 2.5 while the test 2 results show that more than 99% of the cobalt was stabilised in the solid phase down to at least pH 4.5. The next data point for test 2 was at pH 2.5 and so it is likely that this high level of suspension of cobalt in the solid phase is maintained closer to that pH point than is indicated on FIG. 1.

FIG. 2 is a graphical representation of the recovery of nickel to solution over a range of pH values achieved for tests 1 to 3. Tests 1 and 2 resulted in more than 85% of the nickel being maintained in solution at about pH 5. However, in test 2 close to 100% of the nickel was in solution below about pH 4.5 representing a highly successful leaching step. Test 3 showed about 70% of the nickel in solution at about pH 4 thereby indicating that the rate of addition and/or total amount of the oxidant added is a key factor to be controlled. The rate of addition of the oxidising agent may be controlled, as in tests 1-3, by adding it to the leach solution portion wise over a set period of time. The time period may be between 1 to 10 hours, preferably 1 to 5 hours.

The mixed hydroxide precipitate will contain a significant amount of manganese and addition of the amount of oxidising agent which causes stabilisation of the cobalt in the solid phase may also have the same effect on the manganese. Although the monetary value of manganese is significantly less than nickel and cobalt as a commodity, it is preferable to address its separation from the MHP as it is an impurity contained therein and has many stable oxidation states. It is one advantage of the present invention that the separation of manganese from the nickel and/or cobalt within the MHP may be addressed.

The present method may further include the step of separating solid manganese from the acidic leach solution in which the nickel is dissolved. Maintaining the manganese in the solid phase during nickel leaching can be accomplished by suitable pH adjustment in combination with appropriate oxidizing conditions, as is described in relation to FIG. 3.

The method may also further include the step of separating manganese from cobalt by selectively dissolving the cobalt under mildly acidic and slightly reducing conditions. A further method to selectively dissolve the cobalt leaving the manganese in the solid phase is to contact the mixed solid with alkaline ammonia containing solution.

FIG. 3 is a graphical representation of the recovery of manganese to solution over a range of pH values achieved for tests 1 to 3. Test 1 showed that without the presence of a strong oxidant more than 8% of the manganese is in solution below pH 5 and more than 12% is in solution below pH 3. Tests 2 and 3 showed that the addition of sodium persulphate as an oxidant is very effective at stabilising further amounts of manganese in the solid phase. The results show between about 4 to 11% of the manganese is in solution from test 3 between the pH range 6 to 0 and only about 3 to 4% for test 2 over the same pH range. The solution in test 3 was observed to turn a bright purple colour which is known to be an indication of some permanganate formation in solution. Tests 1 and 2 did not demonstrate any purple colour in solution and so the higher amount of oxidant used in test 3 appears to have had a significant effect on increasing the manganese oxidation state and therefore the manganese balance to form greater amounts of permanganate ions. This, at least partially, explains the higher recovery of manganese to solution for test 3 compared to test 2.

FIG. 3 demonstrates that, overall, significant amounts of manganese can be stabilised in the solid phase while substantially all of the nickel is still in solution, thereby allowing an improved separation.

Figure 4:
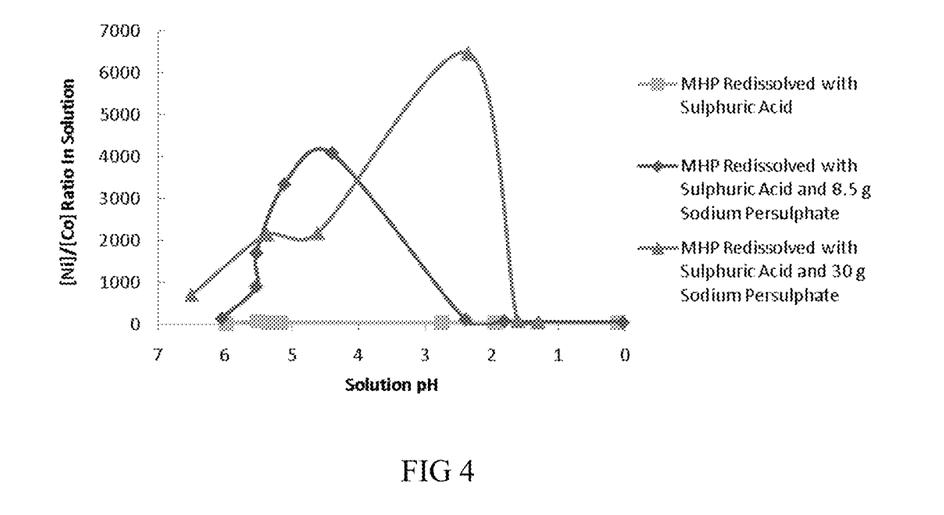
FIG. 4 is a graphical representation of the nickel to cobalt ratio, measured over a range of pH values, in a solution after treatment with three different test conditions.

FIG. 4 is a graphical representation of the nickel to cobalt ratio, measured over a range of pH values, in an MHP leach solution after treatment with the three different test conditions of tests 1 to 3. The optimal separation of nickel and cobalt in the solution occurs somewhere between pH 5 and 2, with better separation at lower pH values for test 3. A nickel to cobalt ratio of 6000, as is seen for test 3 at approximately pH 2.5, indicates excellent separation as the initial ratio of nickel to cobalt in the MHP was about 25. Test 2 also provided very significant and commercially valuable separation of the nickel and cobalt with a value of over 4000 at between pH 4 and 5.

It should be clear that the selectivity of the stabilisation of cobalt and/or manganese in the solid phase while achieving dissolution of the nickel is dependent on both the pH of the solution and the nature/strength and/or amount of the oxidant. Thus the method may further include the step of adjusting the pH of the acidic leach solution to be between about 1 to about 6, preferably between about 2 to about 5. Between pH 1 and 6 includes a pH of 1, 1.5, 2, 2.5, 3, 3.5, 4, 4.5, 5, 5.5 or 6.

In one general embodiment, the pH of the acidic solution is adjusted to be between 1.5 and 5. The pH of the acidic solution may be adjusted to be between 2 and 4, between 2 and 3, between 3 and 5 or between 4 and 5.

Tests 4 and 5 were carried out at a constant pH of 3 for different lengths of time being 1 and 2 hours, respectively. The results of these tests are shown in table 3 and they demonstrate that nickel and cobalt can be effectively separated with substantially all of the cobalt being stabilised in the solid phase while dissolving substantially all of the nickel. The results also indicate that with increased time (in going from test 4 to test 5) the separation is improved and more manganese is also stabilised in the solid phase.

The tests show that an excellent recovery of nickel can be obtained within a 1 to 4 hour time frame. It will be appreciated that the exact time required will depend on a number of factors including the pH, amount of oxidising agent and rate of addition thereof. In one embodiment, the majority of the nickel will have been leached into the leach solution after between about 1 to 10 hours, preferably after between about 1 to about 5 hours, more preferably after between about 1 to about 3 hours.

TABLE 3

Results from tests 4 and 5

|  | Test 4 - 1 hr | Test 5 - 2 hrs |
| --- | --- | --- |
| Nickel Recovery to Solution | 96.75% | 96.99% |
| Cobalt Recovery to Solution | 0.61% | 0.50% |
| Manganese Recovery to Solution | 7.23% | 3.45% |
| Ni/Co Ratio in Solution | 3151 | 3855 |
| Nickel Recovery to Residue | 3.25% | 3.01% |
| Cobalt Recovery to Residue | 99.39% | 99.50% |
| Manganese Recovery to Residue | 92.77% | 96.55% |
| Co/Ni Ratio in Residue | 1.54 | 1.66 |

The results show that greater than 96% of the nickel present in MHP can be preferentially dissolved and maintained in solution under mildly acidic and strongly oxidising conditions in a single stage batch experiment. The residual solid contained greater than 90% of the manganese and greater than 99% of the cobalt. The solid residue containing the cobalt and manganese can easily be filtered off and the nickel solution made available for electrowinning or other suitable process to recover the nickel as a final product.

It will be appreciated by one skilled in the art that the reaction conditions can be altered so that metal solubilisation and the stabilization of cobalt and the like can be altered. This is discussed in more detail hereinafter.

The cobalt-manganese solid concentrate may require further processing but is a valuable intermediate product in its own right assaying at approximately 15 wt. % cobalt. If further separation is desired then dissolving of the cobalt and manganese in an acidic solution below about pH 2.5 and selective reduction to precipitate the manganese may provide a simple way to separate the cobalt from the manganese.

This ability to separate nickel from cobalt in MHP through a single, selective leaching stage at very high efficiency allows the processing of MHP to be greatly simplified over the current industrial methods. As described, the leaching stage may be carried out using sulphuric acid, or any suitably strong acid which can achieve adequate dissolution of the nickel, and any suitably strong oxidant. Further examples of acids which may be suitable include nitric acid, hydrochloric acid and other strong mineral or other acids as would be known to a person of skill in the art to be useful for the dissolution of metal compounds from ores or ore processing intermediates.

Useful oxidising agents may be selected from the group consisting of persulphates, peroxides, permanganates, perchlorates, ozone, oxides and chlorine.

In one embodiment, the oxidising agent may be sodium or potassium persulphate, sodium or potassium permanganate, ozone, magnesium or hydrogen peroxide, chlorine gas or sodium or potassium perchlorate.

Preferably, the oxidising agent is a persulphate or a permanganate. More preferably, the oxidising agent is sodium or potassium persulphate or sodium or potassium permanganate.

A suitable oxidising agent will have the potential to oxidise cobalt compounds within MHP, when exposed to an acidic solution, such that substantial amounts thereof are stabilised in the solid phase while a substantial portion of the corresponding nickel compounds are dissolved. Preferably, the oxidising agent has sufficient oxidising potential to oxidise cobalt(II) to cobalt(III). This is easily ascertained by a person of skill in the art by the application of a simple test. Briefly, if cobalt is in the divalent state then it will readily dissolve in an aqueous solution at pH 4. If, however, cobalt is in the trivalent state it will not readily dissolve in aqueous solution at pH 4. This simple practical test can be employed by a skilled addressee to easily ascertain the likely effectiveness of any oxidising agent proposed for use in the present process.

Although certain gaseous oxidising agents may be useful, to some extent, in the present method it will be appreciated that at least portions thereof will likely escape from the system and thus the separation of the nickel and cobalt will be sub-optimal. Thus, in one preferred embodiment, the oxidising agent to be added to the acidic leach solution is non-gaseous i.e. a solid or a liquid. Sodium or potassium persulphate or sodium or potassium permanganate are particularly preferred as they do not readily form a gas.

The oxidative potential required of the oxidant to ensure oxidation, and hence stabilisation in the solid phase, of the cobalt and/or manganese species in the MHP will vary with pH. In one embodiment, the oxidative potential of the oxidant will be between 0.5 V versus Standard Hydrogen Electrode (SHE) to about 3.0 V at a pH of from about 0 to about 6. Suitably, at a pH value of between about 6 to about 4 the oxidative potential of the oxidant will be between about 0.5 V to 1.0 V. Typically, at a pH value of between about 4 to about 1 the oxidative potential of the oxidant is between about 1.0 V to about 3.0 V, preferably between about 1.0 V to about 2.0 V.

A person of skill in the art would be aware of a number of ways in which the oxidative potential of any particular oxidising agent could be ascertained at a particular pH. Standard reference texts may provide tables of commonly used oxidising agents along with their associated potential at one or more selected pH levels. Alternatively, an indication of oxidising potential may be gleaned by employing the oxidising agent in a simple experiment which would be known to a chemist in the field whereby the potential difference between platinum metal and a suitable reference electrode are subsequently measured.

As mentioned, the nickel solution produced by the selective leach may be used to recover the final nickel product by known industrial techniques such as nickel electrowinning or hydrogen reduction. To further demonstrate the potential use of the present method in obtaining nickel metal, a series of experiments were carried out applying the general method already discussed to generate a nickel solution with a nickel concentration sufficiently high for use in a subsequent electrowinning process. A key difference between the following tests compared with those described above is that the solution into which the nickel from the MHP is leached already contains aqueous nickel sulphate and acid to thereby simulate the anolyte produced in the nickel electrowinning process. The tests thus demonstrate the simplicity of the present method in obtaining a nickel solution in a way that is compatible with the nickel electrowinning process where a nickel metal product can be directly obtained.

An MHP sample for use in these tests was assayed to ascertain its composition both before and after drying. The results of the assay are shown in table 4 (shown in two parts).

TABLE 4

Composition of MHP (dry) for tests 6-11 (oxidation states assumed)

| wt. % | $Ni^{2+}$ | $Co^{2+}$ | $Mn^{2+}$ | $Mg^{2+}$ | $Ca^{2+}$ | $Fe^{3+}$ |
|---|---|---|---|---|---|---|
| Dry | 44.5 | 2.4 | 0.78 | 0.77 | 0.4 | 0.2 |
| Moist | 28.0 | 1.5 | 0.49 | 0.49 | 0.25 | 0.13 |

| wt. % | $Al^{3+}$ | $Zn^{2+}$ | $Cu^{2+}$ |
|---|---|---|---|
| Dry | 0.08 | 0.04 | 0.02 |
| Moist | 0.05 | 0.03 | 0.01 |

The tests were carried out in an agitated batch reactor. Firstly, a synthetic nickel anolyte solution containing 50 g-Ni/L-anolyte as $NiSO_4$(aq), 50 g-$H_2SO_4$/L-anolyte was heated to a temperature of 60-65° C. Sodium sulphate was included in the solution to simulate a nickel electrolyte as it is typically added to improve the solution conductivity. 100 g-$Na_2SO_4$/L-anolyte was added in tests 6, 7 and 8 and 167 g-$Na_2SO_4$/L-anolyte added in tests 9, 10 and 11. The tests were run for either 180 or 240 minutes at which time the solids were isolated from the solution by vacuum filtration and washed with two lots of 300 mL deionized water. The solids are then dried to constant mass at 60° C. Samples of the residual solids were then assayed in order to verify the mass balance.

The percentage stoichiometric addition of MHP used in the tests was calculated based on 100% stoichiometric MHP addition being equivalent to the amount of acid required to dissolve all of the nickel compounds content based on assumed chemical reactions. Based on the quantities of MHP and acid used in the tests the metal deportment was measured at leaching conditions over a pH range of 5.7 to 4.5.

The particular experimental conditions and measurements taken in this set of tests are summarized in table 5. Tests 6, 7 and 8 were run for 180 minutes and tests 9, 10 and 11 were extended to 240 minute duration. The main variable was the amount of MHP added to the experiment expressed as the % of the stoichiometric requirement for all the nickel hydroxide to react with the acid available as discussed above.

In one embodiment, the ore or ore processing intermediate, such as the MHP, is present in a stoichiometric % amount of between 100% to about 40% compared to the amount of acid, preferably about 90% to about 50%, more preferably about 85% to about 60%.

The oxidising agent is present in the leach solution in either 125% (tests 7 to 11) or 150% (test 6) stoichiometric equivalents based on the calculated number of moles of cobalt and manganese present in the ore or ore processing intermediate. The effective separation of cobalt and manganese at these stoichiometric levels (near 100%) show that the sodium persulphate utilisation is high.

In one embodiment, between 70% to 500% stoichiometric equivalents of oxidising agent to combined moles of cobalt and manganese may be added, preferably between 80% to 400%, more preferably between 80% to 200% or 100% to 150%, even more preferably about 125%.

It will be appreciated that while the results discussed herein relate to batch experiments, practically, the method described lends itself well to a multistage counter current arrangement to improve the process outcomes. Within such a multistage arrangement the particular process conditions in each step will vary and, indeed, can be optimised with a specific purpose in mind. Using this approach the conditions for nickel dissolution from the mixed nickel-cobalt hydroxide precipitate may be optimised while encouraging the maximum levels of impurities and cobalt to stabilise in the solid phase.

As an example, in the nickel leaching stage the stoichiometric equivalents of MHP added may be kept relatively low and the pH relatively high whereas it may be beneficial to have the pH considerably lower at another stage of the process where the objective is to achieve an upgraded cobalt concentrate with minimal nickel content.

Once again, the results indicate that the present method is a simple and relatively direct process for the separation of nickel from cobalt in a source material, such as MHP, without the need for solvent extraction steps. The majority of the nickel is recovered to the leach solution in all of tests 6-11 while cobalt leaching is minimal. There is potential for further optimisation, as indicated in tests 1-5, by adjusting the pH or the amount or rate of oxidant addition. The advantages of the present method are further emphasised by the demonstration of leaching of nickel directly from an impure solid source into an anolyte solution creating a catholyte solution suitable for direct electrowinning of nickel metal.

The present process is of simpler design and of lower capital cost compared with prior art approaches due to fewer processing steps, relatively low temperatures during the leaching step and the lack of a requirement for a solvent extraction operation to extract the nickel and cobalt. In one embodiment the temperature during the leaching of nickel is greater than 20° C. but less than 120° C., preferably greater than 50° C. but less than 100° C., more preferably from about 60° C. to about 90° C.

The separation of nickel from cobalt in the MHP is surprisingly effective and provides distinct advantages over

TABLE 5

Leaching conditions for tests 6-11

| | Test Number | | | | | |
|---|---|---|---|---|---|---|
| | 6 | 7 | 8 | 9 | 10 | 11 |
| Leaching Time (min) | 180 | 180 | 180 | 240 | 240 | 240 |
| Leaching Temp ° C. | 65 | 65 | 65 | 65 | 65 | 65 |
| Anolyte Density g/mL | 1.21 | 1.21 | 1.21 | 1.28 | 1.28 | 1.27 |
| Anolyte Mass g | 725.76 | 725.76 | 725.76 | 766.56 | 766.56 | 760.44 |
| Anolyte Volume L | 0.60 | 0.60 | 0.60 | 0.60 | 0.60 | 0.60 |
| Anolyte Ni ($NiSO_4$ g-Ni/L) | 50 | 50 | 50 | 50 | 50 | 50 |
| Anolyte $Na_2SO_4$ g-$Na_2SO_4$/L | 100 | 100 | 100 | 227 | 227 | 227 |
| Anolyte $H_2SO_4$ | 50 | 50 | 50 | 50 | 50 | 50 |
| MHP (moist) g | 123.7 | 117.5 | 111.3 | 105.2 | 99.0 | 92.8 |
| Stoichiometric MHP Addition % | 100 | 95 | 90 | 85 | 80 | 75 |
| Sodium Persulfate Added g | 7.80 | 6.17 | 5.85 | 5.53 | 5.20 | 4.88 |
| Stoich. Persulfate Addition % | 150 | 125 | 125 | 125 | 125 | 125 |
| Final Slurry Mass g | 824.73 | 818.20 | 819.80 | 825.00 | 823.69 | 822.55 |
| Final Catholyte Mass g | 795.35 | 790.72 | 793.40 | 802.47 | 806.29 | 807.90 |
| Final Catholyte density g/mL | 1.26 | 1.24 | 1.25 | 1.31 | 1.32 | 1.32 |
| Final Catholyte Volume L | 0.63 | 0.64 | 0.63 | 0.61 | 0.61 | 0.61 |
| Final Solids Mass (dry) g | 29.38 | 27.48 | 26.40 | 22.53 | 17.40 | 14.65 |

Figure 5:
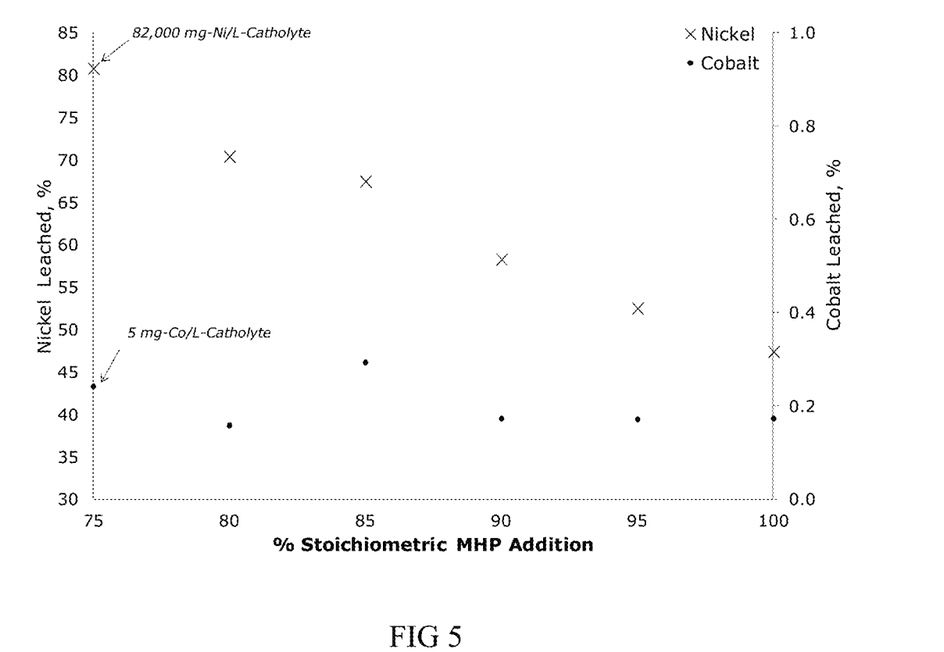
FIG. 5 is a graphical representation of the amounts of nickel and cobalt leached from a mixed nickel-cobalt hydroxide precipitate to solution in tests 6 to 11.

The extent and selectivity of the leaching of nickel from the MHP of table 4 into the simulated nickel anolyte solution is summarized in FIG. 5. For the range of MHP addition investigated (75-100% stoichiometric requirement based on acid use) it can be seen that the cobalt did not dissolve to any great extent and indeed was substantially maintained in the solid state while the fraction of nickel which was leached increased with decreasing MHP addition. This variation in the level of nickel extracted is likely to be due to the pH effect as 100% MHP (in test 6) addition results in a final pH of 5.7 whereas 75% MHP (in test 11) addition results in a lower terminal pH of 4.5. Thus, lowering the stoichiometric MHP addition value results in a better return of nickel leached therefrom. The effects of pH on leaching were already demonstrated in tests 1 to 5 and the results of tests 6 to 11 confirm the importance of optimising the pH for leaching and again indicate that a pH below 5 is preferred.

certain prior art approaches which instead attempt to selectively precipitate cobalt out of a solution containing both nickel and cobalt. Understanding in the field regarding separation of cobalt from nickel in MHP suggests that the selective leaching of nickel from MHP raises a risk of the solid nickel being passivated (coated) by cobalt(III) solids which could interfere with or prevent the nickel leaching reaction. The present inventors have shown that, surprisingly, this is not in fact the case to any extent which would preclude an efficient separation under the conditions presently identified.

Selectively precipitating cobalt from a nickel and cobalt containing solution tends to be slow and the precipitate may be somewhat difficult to handle even when seeding is employed. Instead, for the present process, the fact that the cobalt is in the solid phase already surprisingly allows for a cobalt concentrate residue that is easy to filter and which avoids the disadvantages of certain of the prior art approaches.

Thus, the present method provides a number of advantages over prior art oxidative approaches including the provision of a sufficiently fast reaction, formation of a cobalt containing solid that is filterable and efficient use of the oxidant, which advantages stem from the approach of directly treating a solid MHP with the acidic leach solution containing an oxidant to selectively dissolve the nickel in preference to the cobalt. A relatively clean cobalt concentrate is also achieved in a single stage i.e. approximately 15 wt % cobalt, which is a further improvement over processes employing the selective precipitation of cobalt from solution.

Figure 6:
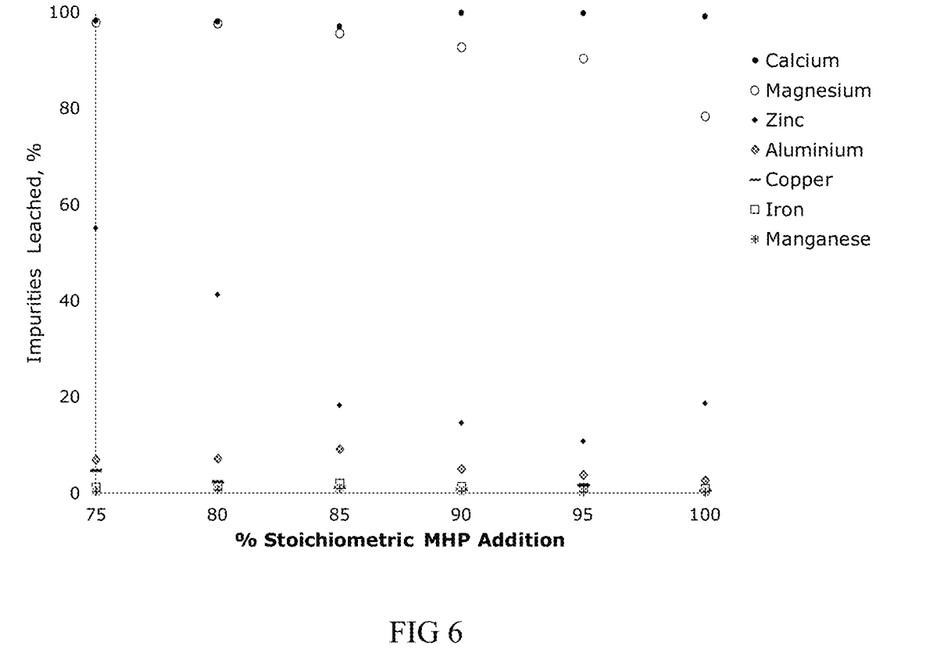
FIG. 6 is a graphical representation of the amounts of various impurities leached from a mixed nickel-cobalt hydroxide precipitate to solution in tests 6 to 11.

The behaviour of the various metallic impurities during MHP leaching is shown in FIG. 6. The amounts of these impurities found within the leaching solution is also indicated in table 6. Calcium and magnesium were largely dissolved during the nickel leaching. Zinc dissolution was dependent on the rate of MHP addition (and hence the resulting pH) so operating at a higher pH prior to electrowinning can be used to prevent zinc dissolution. The extent of aluminium, copper, iron and manganese dissolution is seen to be low and the final solution content of all the impurities is <5 mg/L, except for calcium and magnesium.

TABLE 6

Amounts of nickel and various impurities found in the final leach solution (nickel catholyte) for tests 6-11

| Test | Al | Ca | Co | Cr | Cu | Fe | Mg | Mn | Na | Ni | Zn |
|---|---|---|---|---|---|---|---|---|---|---|---|
| 6 | 2 | 86 | 4 | 0.0 | 0.2 | 2 | 170 | 1 | 21940 | 71460 | 21 |
| 7 | 2 | 261 | 4 | 0.1 | 0.5 | 2 | 430 | 1 | 21180 | 73239 | 10 |
| 8 | 3 | 309 | 4 | 0.1 | 0.2 | 2 | 506 | 3 | 19978 | 77295 | 13 |
| 9 | 6 | 434 | 6 | 0.2 | 0.3 | 3 | 689 | 6 | 62089 | 77473 | 7 |
| 10 | 4 | 427 | 3 | 0.1 | 0.6 | 2 | 692 | 4 | 63614 | 78051 | 16 |
| 11 | 4 | 369 | 5 | 0.2 | 1.3 | 2 | 611 | 2 | 51739 | 82871 | 19 |

Although the discussion above has generally related to recovery of nickel in the presence of cobalt it should be appreciated that the present method may be equally applicable to various metals which may be separated from cobalt in an ore or like material in a similar manner to that described. Copper and zinc are particularly preferred examples of such metals. Neither copper nor zinc oxidise readily above their divalent state and so they can be dissolved in an acidic leach solution while cobalt and manganese are oxidised and thereby stabilised in the solid phase.

Figure 7:
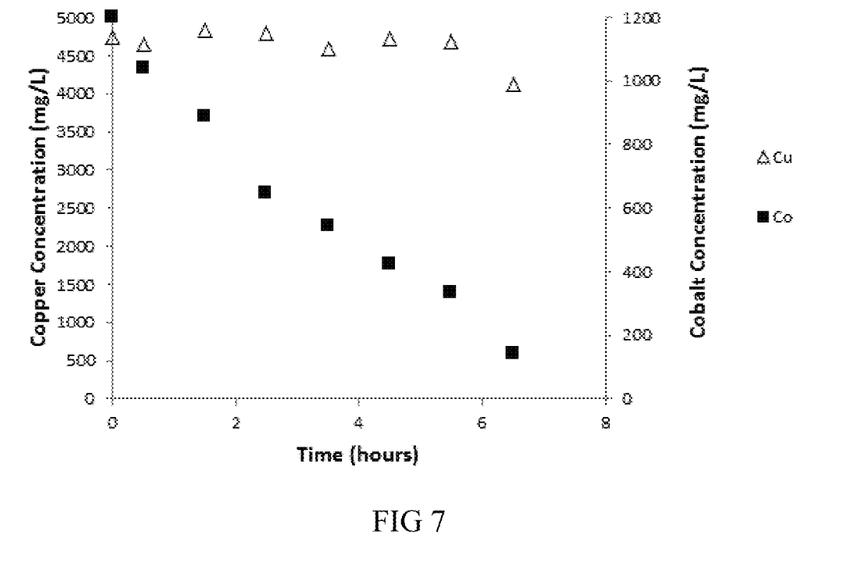
FIG. 7 is a graphical representation of the selective recovery of cobalt in the presence of copper.

FIG. 7 is a graphical representation of the selective oxidative precipitation of cobalt from solution in the presence of copper. Briefly, the test conditions were use of 240% stoichiometric sodium persulphate based on cobalt concentration, 90° C. with an initial pH of 1.4 and terminal pH of 2.7 (pH adjustment with sodium hydroxide). It can be seen that the majority of the copper can be maintained in solution while increasing amounts of cobalt are precipitated into the solid phase with time. At 4 to 6 hours the majority of the copper remained in solution while the majority of the cobalt was selectively precipitated. This result indicates that copper could be separated from cobalt in an ore or ore processing intermediate in a similar manner to that described in detail herein for nickel-cobalt MHP.

The effect of adding a mixture of an acidic leach solution and an oxidant to a solid ore or solid ore intermediate can be shown by comparing this to a method of staged addition of the acidic leach solution followed by the oxidant, and the staged addition of the oxidant followed by the acidic leach solution.

In order to ensure consistency in this comparison the same industry sample of MHP was used in the following trials. The MHP was stored in a plastic bag within a sealed container to minimize evaporation and oxidation. The sample of MHP had an average moisture content of 43.5% by weight, and the composition of the sample of MHP is provided in Table 7 below.

TABLE 7

Composition (wt % wet) of the feed MHP sample based on average back calculated values

| wt. % | Al | Ca | Co | Cr | Cu | Fe | Mg | Mn | Ni | Si | Zn |
|---|---|---|---|---|---|---|---|---|---|---|---|
| MHP | 0.02 | 0.04 | 0.71 | 0.01 | 0.01 | 0.02 | 0.67 | 1.40 | 22.4 | 0.19 | 0.14 |

Sulphuric acid (98 wt. %, pure), an oxidant (crystalline sodium peroxydisulphate, 98 wt. % pure) and deionized water were used as reagents in the follow trials. The trials were performed in a covered 1.2 L baffle glass reactor. The MHP and deionized water was slurried in the reactor and heated to 60° C. Sufficient MHP and deionized water was added to target a final solution that had a nickel concentration of approximately 55 g/L and a final volume of 1 L. This took into account the moisture associated with the MHP and the water generated by the leaching reactions.

Due to the exothermic reaction of acid with water, the acidic leach solution was added slowly to the solution over a few minutes. Homogenous mixing of the slurry was provided by an overhead agitator with a two-bladed high-density plastic impeller stirred at 800 rpm.

To this solution was added an acidic leach solution followed by an oxidant, or with the oxidant followed by the acidic leach solution, or with a mixture of the acidic leach solution and the oxidant.

The initial MHP composition was estimated and the required amount of oxidant and acidic leach solution were calculated from this estimate. The targeted amount of oxidant was 115% of the required amount of oxidant needed to oxidise all of the manganese and all of the cobalt from the divalent to the trivalent state (as shown in equations 1 and 2).

$$2Mn(OH)_2 + Na_2S_2O_8 \rightarrow MnOOH + Na_2SO_4 + H_2SO_4 \qquad \text{Equation 1}$$

$$2Co(OH)_2 + Na_2S_2O_8 \rightarrow CoOOH + Na_2SO_4 + H_2SO_4 \qquad \text{Equation 2}$$

The targeted amount of acidic leach solution was 85% of the required acidic leach solution to dissolve all of the nickel and magnesium, assuming that all of the nickel was present as nickel hydroxysulphate and all of the magnesium was present as magnesium hydroxide (as shown in equations 3 and 4).

$$Ni_7(OH)_{12}SO_4 + 6H_2SO_4 \rightarrow 7NiSO_4(aq) + 12H_2O \qquad \text{Equation 3}$$

$$Mg(OH)_2 + H_2SO_4 \rightarrow MgSO_4(aq) + 2H_2O \qquad \text{Equation 4}$$

Upon completion of the trials, the amount of oxidant added was calculated to be 187% of the amount required to oxidise all of the cobalt and manganese from the divalent to the trivalent state, and the amount of acidic leach solution was calculated to be 82% of the required acid to dissolve all of the nickel and magnesium assuming that all of the nickel was present as nickel hydroxylsulphate and all of the magnesium was present as magnesium hydroxide.

Figure 8:
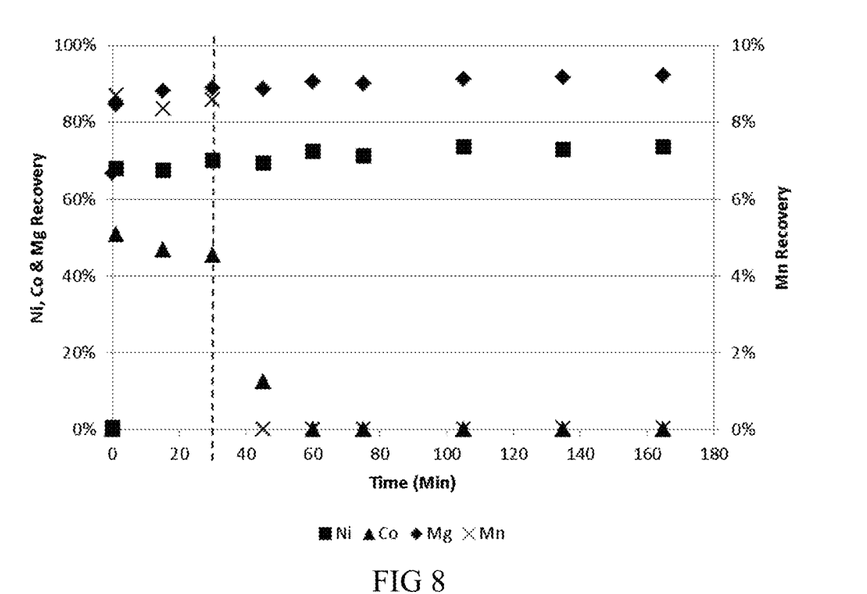
FIG. 8 is a graphical representation of nickel, cobalt, magnesium and manganese deportment over time where the addition of acidic leach solution addition is followed by the addition of the oxidant after 30 minutes.

FIG. 8 is a graphical representation of nickel, cobalt, magnesium and manganese deportment over time where the addition of the acidic leach solution is followed by the addition of the oxidant after 30 minutes.

Significant magnesium (67%) dissolved upon contact of the MHP with deionised water. This indicates that a portion of the magnesium was present in the MHP as a water soluble salt, most likely magnesium sulphate. Upon addition of the acidic leach solution, undissolved magnesium reacted very quickly to reach 85% recovery to solution. A further 5% of the magnesium then dissolved in the first hour, and a final total recovery to solution of 92% was achieved.

The nickel in the MHP dissolved quickly with greater than 65% recovered to solution upon addition of the acidic leach solution. Further nickel slowly dissolved over the course of the trial and eventually reached a final total recovery to solution of approximately 73%. The nickel recovery was limited by the amount of acidic leach solution added, as only 82% of the acidic leach solution required to dissolve all of the nickel and magnesium was added.

A significant amount of cobalt and manganese dissolved upon addition of the acidic leach solution. In this regard, approximately 50% of the cobalt and greater than 8% of the manganese entered the solution. The oxidant was added after 30 minutes.

Upon addition of the oxidant, the cobalt and the manganese oxidatively precipitated from the solution. The oxidative precipitation of the manganese was effectively complete 15 minutes after the addition of the oxidant whereas the oxidative precipitation of cobalt was slower, taking approximately 30 minutes. The oxidative precipitation process was slow despite excess oxidant being added (187% of the required amount to oxidise all of the cobalt and manganese from the divalent to the trivalent state).

It should be clear from this trial that the addition of the acidic leach solution to MHP results in fast dissolution of significant amounts of nickel and cobalt. Subsequent addition of the oxidant results in oxidative precipitation of dissolved cobalt from the acidic leach solution. The oxidative precipitation appears to be relatively slow compared to the leaching reaction. As such, this resulted in a time consuming process which is less commercially viable.

Figure 9:
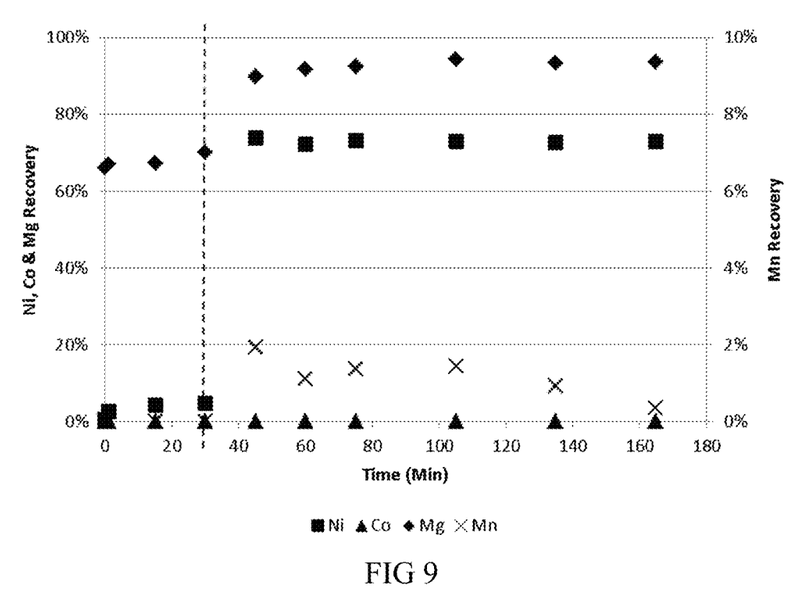
FIG. 9 is a graphical representation of nickel, cobalt, magnesium and manganese deportment over time where the addition of oxidant is followed by the addition of the acidic leach solution after 30 minutes.

FIG. 9 is a graphical representation of nickel, cobalt, magnesium and manganese deportment over time where the addition of the oxidant is followed by the addition of the acidic leach solution after 30 minutes.

As with the previous trial, a significant amount of magnesium dissolved upon contact of the MHP with deionised water. Once the addition of the oxidant had been completed, small amounts of nickel and magnesium dissolved over the ensuing 30 minutes. It is postulated that acid generated from the oxidation reactions caused the nickel and magnesium to dissolve. Acidic leach solution was added after 30 minutes, where nickel and magnesium dissolved with the nickel recovered to solution increasing to the final total recovery to solution of 73% within 15 minutes. The magnesium recovery to solution increased to 90% within 15 minutes, and slowly increased to a final recovery to solution of 93%. Nickel recovery was limited by the amount of acidic leach solution added, as only 82% of the acidic leach solution required to dissolve all of the nickel and magnesium was added.

Cobalt was not dissolved to any appreciable extent during the experiment. However, approximately 2% of the manganese dissolved upon addition of the acidic leach solution. The dissolution of manganese is undesirable as manganese is an impurity in downstream processing of nickel. It is believed that manganese dissolution was due to inefficient utilization of oxidant over the initial 30 minutes of the experiment. In the first 30 minutes, the oxidant was in contact with the MHP solids and there was very little acid present meaning that the MHP did not undergo significant leaching reactions. As such, it is believed that the surfaces of the MHP particles were exposed to the oxidant and formed nickel hydroxide which did not allow significant charge transfer through its structure. The nickel hydroxide therefore acted as an insulative barrier. In other words, only the surfaces of the MHP particles were exposed to oxidant and able to undergo oxidative reactions. If only the surfaces of the MHP particles were able to react with the oxidant, the oxidant was effectively present in a stoichiometric excess when compared to the available reaction sites. This excess of oxidant may have caused undesirable oxidation reactions. For instance, manganese can be oxidised from the divalent to trivalent state and further to the quadrivalent or even the heptavalent state. The heptavalent state of manganese is known as permanganate, and is soluble in the acidic conditions of this leaching process. Additionally, nickel can be oxidised from the divalent to trivalent state which forms a stable nickel oxyhydroxide solid in acidic conditions. The oxidation of nickel would result in the stabilisation of nickel to the solid phase and is highly undesirable.

It should be clear that the formation of an insulative layer would limit the recovery of nickel into solution. Additionally, this insulative layer may also result in the formation of nickel oxyhydroxide which does not dissolve in the acidic leach solution, and this is in contrast to the desired selective dissolution of nickel.

Figure 10:
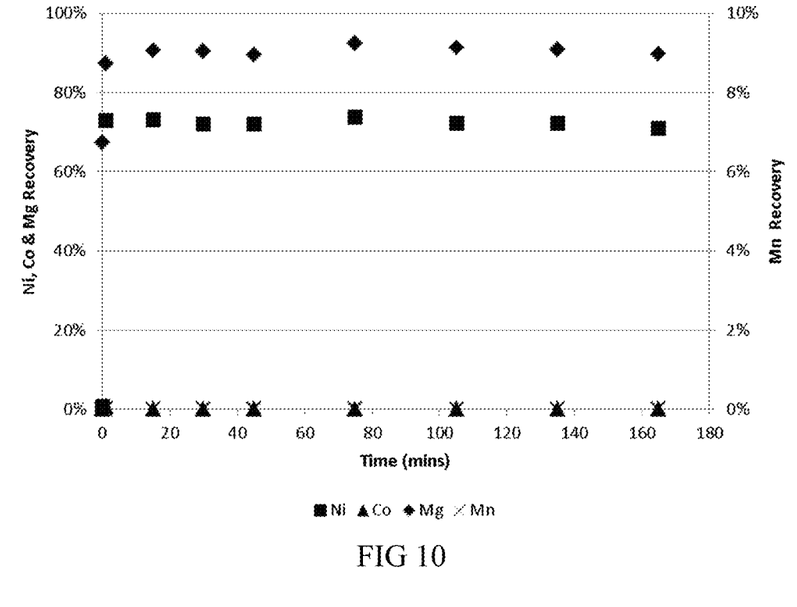
FIG. 10 is a graphical representation of nickel, cobalt, magnesium and manganese deportment over time where the oxidant and acidic leach solution are added simultaneous or as a mixture.

FIG. 10 is a graphical representation of nickel, cobalt, magnesium and manganese deportment over time where the oxidant and the acidic leach solution are added simultaneous or as a mixture.

As with the previous trials, significant amounts of magnesium dissolved upon contact of the MHP with deionized water. Upon addition of a mixture of acidic leach solution and an oxidant, the magnesium recovery to solution increased to 87%, and steadily increased over the course of the experiment to achieve a final total recovery to solution of approximately 90%. The nickel dissolved very quickly with the final total recovery to solution of 73% being achieved upon completion of the addition of the mixture comprising the acidic leach solution and the oxidant. Similar to the above trials, the nickel recovery was limited by the amount of acidic leach solution added, as only 82% of the acid required to dissolve all of the nickel and magnesium was added to these trials. Cobalt and magnesium were not dissolved to any appreciable extent during the experiment.

It should be clear that the simultaneous addition of an acidic leach solution and oxidant, or a mixture of an acidic leach solution and an oxidant, resulted in an efficient method of separating nickel and cobalt by selective dissolution of nickel with complete separation achieved upon complete addition of the mixture.

These trials show clearly that the nature of the addition of the acidic leach solution and the oxidant is important. In this regard, the dissolution and then subsequent precipitation of the first trial resulted in a significant delay in the cobalt and manganese being precipitated from solution. The formation of an insulative layer on the MHP in the second trial was detrimental to selective nickel dissolution, and could lead to undesirable oxidative reactions of manganese and nickel. The use of a mixture of acidic leaching solution and oxidant in the third trial resulted in a fast and efficient selective dissolution process.

This fast process results in smaller equipment being required which incurs lower capital and maintenance costs. For instance, the staged addition of acidic leach solution and oxidant took approximately 60 minutes for complete separation at maximum nickel recovery, whereas the use of a mixture of acidic leach solution and oxidant occurred very quickly, essentially once all of the mixture was added. As such, it should be clear that the use of a mixture comprising an acidic leaching solution and an oxidant leads to a faster process and is a more commercial viable process. In other words, the use of a mixture comprising an acidic leaching solution and an oxidant leads to a process than is 60 times faster than the staged process. The trials were completed with less acidic leach solution then required so that the effects of the oxidant could be accurate observed. In this regard, it will be appreciated that the amount of metal dissolution can be controlled by the amount of acidic leaching solution added. As such, in one embodiment the selective dissolution of the metal is suitably greater than 50%, or greater than 60%, or greater than 70%, greater than 80%, or greater than 90%, or greater than 95%, or greater than 99% by mass of the metal.

Alternatively, it should be clear that the amount of oxidising agent can be altered to determine the amount of cobalt and/or manganese that is stabilized in a solid phase. In this regard, it will be appreciated that the amount of oxidising agent is sufficient to stabilize greater than 50%, or greater than 60%, or greater than 70%, greater than 80%, or greater than 90%, or greater than 95%, or greater than 99% by mass of the cobalt in a solid phase.

Throughout the specification the aim has been to describe preferred embodiments of the invention without limiting the invention to any one embodiment or specific collection of features. It will be appreciated by those of skill in the art that, in light of the present disclosure, various modifications and changes can be made in the particular embodiments exemplified without departing from the scope of the invention.

The invention claimed is:

1. A method of selectively leaching a metal selected from the group consisting of nickel, copper and zinc from a solid ore or solid ore processing intermediate comprising the metal, cobalt and manganese, the method comprising:
   a) providing a mixture comprising an acidic leach solution and an oxidizing agent; and
   b) mixing the mixture with the solid ore or solid ore processing intermediate,
   wherein there is sufficient oxidizing agent to stabilize greater than 95% by mass of the cobalt to cause it to be stabilized in a solid phase while greater than 50% by mass of the metal is selectively dissolved, and
   wherein the oxidizing agent is present in the acidic leach solution in 70% to 500% stoichiometric equivalents to cobalt and manganese in the solid ore or solid ore processing intermediate.

2. The method of claim 1, wherein greater than 70% by mass of the metal is selectively dissolved.

3. The method of claim 1, wherein greater than 90% by mass of the metal is selectively dissolved.

4. The method of claim 1, wherein the metal is nickel.

5. The method of claim 1, wherein the solid ore or solid ore processing intermediate is a mixed nickel-cobalt hydroxide precipitate.

6. The method of claim 1, wherein the oxidizing agent has sufficient oxidizing potential to oxidize cobalt(II) to cobalt (III).

7. The method of claim 6, wherein the oxidizing agent has an oxidative potential of greater than 0.5 V (SHE).

8. The method of claim 6, wherein the oxidizing agent has an oxidative potential between 0.5 V and 3.0 V (SHE).

9. The method of claim 1, wherein the acidic leach solution has a pH from 1 to 6.

10. The method of claim 9, wherein the acidic leach solution has a pH from 2 to 5.

11. The method of claim 8, wherein the oxidizing agent has an oxidative potential of 0.5 V to 3.0 V (SHE) at a pH from 0 to 6.

12. The method of claim 11, wherein the oxidizing agent has an oxidative potential of 0.5 V to 1.0 V (SHE) at a pH from 4 to 6.

13. The method of claim 11, wherein the oxidizing agent has an oxidative potential of 1.0 V to 2.0 V (SHE) at a pH from 1 to 4.

14. The method of claim 1, wherein the oxidizing agent is selected from the group consisting of persulphates, peroxides, permanganates, perchlorates, ozone, oxides and chlorine.

15. The method of claim 1, further comprising controlling addition of the oxidizing agent.

16. The method of claim 1, further comprising heating the acidic leach solution to greater than 50° C.

17. The method of claim 1, wherein greater than 50% by mass of the metal has been leached into the acidic leach solution from the solid ore or solid ore processing intermediate after 1 to 5 hours.

18. The method of claim 1, wherein the oxidizing agent is present in the acidic leach solution in 80% to 200% stoichiometric equivalents to combined cobalt and manganese in the solid ore or solid ore processing intermediate.

19. The method of claim 1, wherein treatment with the amount of oxidizing agent causes a major portion of the manganese to be stabilized in a solid phase while a major portion of the metal is dissolved.

20. The method of claim 1 wherein, after leaching is complete, extracted metal is recoverable directly from the acidic leach solution by electrowinning or hydrogen reduction.

21. A method of recovering nickel and cobalt from a mixed nickel-cobalt hydroxide precipitate, wherein the mixed nickel-cobalt hydroxide precipitate comprises manganese, the method comprising:
   (a) providing a mixture comprising an acidic leach solution and an oxidizing agent, wherein there is sufficient oxidizing agent to stabilize greater than 95% by mass of the cobalt to cause it to be stabilized in the solid phase while greater than 50% by mass of the nickel is selectively dissolved;
   (b) mixing the mixture with the mixed nickel-cobalt hydroxide precipitate,
   (c) separating the cobalt in the solid phase from the acidic leach solution containing dissolved nickel to recover the cobalt in the solid phase; and
   (d) recovering the nickel from the acidic leach solution, wherein the oxidizing agent is present in the acidic leach solution in 70% to 500% stoichiometric equivalents to cobalt and manganese in the mixed nickel-cobalt hydroxide precipitate.

22. The method of claim 21, wherein addition of an amount of oxidizing agent also causes a major portion of the manganese to be stabilized in a solid phase.

23. The method of claim 21, wherein there is sufficient oxidizing agent to stabilize greater than 99% by mass of the cobalt to cause it to be stabilized in a solid phase.

24. A method of selectively leaching a metal selected from the group consisting of nickel, copper, and zinc from a solid ore or solid ore processing intermediate comprising the metal, cobalt and manganese, the method comprising:
   a) providing a mixture comprising an acidic leach solution and an oxidizing agent; and
   b) mixing the mixture with the solid ore or solid ore processing intermediate,
   wherein there is sufficient oxidizing agent to stabilize greater than 99% by mass of the cobalt to cause it to be stabilized in a solid phase while greater than 50% by mass of the metal is selectively dissolved, and
   wherein the oxidizing agent is present in the acidic leach solution in 70% to 500% stoichiometric equivalents to cobalt and manganese in the solid ore or solid ore processing intermediate.

\* \* \* \* \*